United States Patent
Lee et al.

(10) Patent No.: US 8,719,005 B1
(45) Date of Patent: May 6, 2014

(54) METHOD AND APPARATUS FOR USING DIRECTED REASONING TO RESPOND TO NATURAL LANGUAGE QUERIES

(76) Inventors: Rusty Shawn Lee, Seattle, WA (US); Marc Joseph Angelone, Portland, ME (US)

(*) Notice: Subject to any disclaimer, the term of this patent is extended or adjusted under 35 U.S.C. 154(b) by 1717 days.

(21) Appl. No.: 11/672,969

(22) Filed: Feb. 9, 2007

Related U.S. Application Data

(60) Provisional application No. 60/772,831, filed on Feb. 10, 2006.

(51) Int. Cl.
*G06F 17/27* (2006.01)
*G06F 17/21* (2006.01)
*G06F 7/00* (2006.01)
*G06F 17/30* (2006.01)

(52) U.S. Cl.
USPC .................................. 704/9; 704/10; 707/706

(58) Field of Classification Search
USPC .................................. 707/706, 708, 755, 771
See application file for complete search history.

(56) References Cited

U.S. PATENT DOCUMENTS

| | | | | | |
|---|---|---|---|---|---|
| 5,715,468 | A | * | 2/1998 | Budzinski | 704/9 |
| 6,052,656 | A | * | 4/2000 | Suda et al. | 704/9 |
| 6,078,914 | A | * | 6/2000 | Redfern | 1/1 |
| 6,766,320 | B1 | * | 7/2004 | Wang et al. | 704/9 |
| 6,904,428 | B2 | * | 6/2005 | Frieder et al. | 1/1 |
| 6,910,003 | B1 | * | 6/2005 | Arnold et al. | 704/4 |
| 7,127,402 | B2 | * | 10/2006 | Ross et al. | 704/275 |
| 7,555,475 | B2 | * | 6/2009 | Quiroga et al. | 1/1 |
| 2002/0116176 | A1 | * | 8/2002 | Tsourikov et al. | 704/9 |
| 2003/0093276 | A1 | * | 5/2003 | Miller et al. | 704/257 |
| 2005/0216443 | A1 | * | 9/2005 | Morton et al. | 707/3 |
| 2005/0222901 | A1 | * | 10/2005 | Agarwal et al. | 705/14 |
| 2007/0033005 | A1 | * | 2/2007 | Cristo et al. | 704/9 |

OTHER PUBLICATIONS

Hunter, Anthony. "A Default Logic Based Framework for Context-Dependent Reasoning with Lexical Knowledge". Journal of Intelligent Information Systems, 16, 65-87, 2001.*

* cited by examiner

*Primary Examiner* — Jesse Pullias
(74) *Attorney, Agent, or Firm* — Valauskas Corder LLC

(57) ABSTRACT

A method and apparatus are presented for using directed reasoning to provide natural language responses to questions and commands in natural language. The directed reasoning process uses concepts in the natural language sentence to identify relevant response concepts in a knowledge base, by creating a continuous chain of logic from the input concept to the response concept and limiting the creation of the logic chains to only those consistent with the context of the natural language sentence and information in the knowledge base. The invention allows the identification of relevant concepts that elude traditional concept searching based on pattern matching, while focusing computational resources on only those logic calculations relevant to the natural language sentence and knowledge base. The invention will automatically identify the relevant source documents to use and create a knowledge base during run time, without requiring preprogrammed ontologies or knowledge bases.

24 Claims, 2 Drawing Sheets

Answer Me!

Type your question below:

[                    ] [Answer!]

| Sponsored Link: Loveable dogs need homes | Answer Me! | Sponsored Link: Dog supplies, 30% off! |

| A dog is a four-legged animal.<br>    ...*The dog is a canine mammal*... | [160] en.wikipedia.org/wiki/Dog |
|---|---|
| A dog is man's best friend.<br>    ..."*A dog is man's best friend." That's true*... | [82] www.wagner-articles.com/pet.html |
| A dog is alive.<br>    ...*An animal is alive. Is a gene alive*... | [13] cfpm.org/~majordom/memetics/2000/14605.html |

Type your question below:

[ What is a dog? ] [Answer!]

FIG. 3

METHOD AND APPARATUS FOR USING DIRECTED REASONING TO RESPOND TO NATURAL LANGUAGE QUERIES

CROSS-REFERENCE TO RELATED APPLICATIONS

This application claims priority to U.S. Provisional Patent Application Ser. No. 60/772,831, filed Feb. 10, 2006.

STATEMENT REGARDING FEDERALLY SPONSORED RESEARCH OR DEVELOPMENT

Not Applicable.

REFERENCE TO A SEQUENCE LISTING, A TABLE, OR A COMPUTER PROGRAM, LISTING COMPACT DISC APPENDIX

Not Applicable.

BACKGROUND OF THE INVENTION

The present invention is related to natural language processing, and more particularly to generating responses to natural language queries.

Traditional natural language processing systems are capable of generating semantic and syntactic parses from a natural language sentence and responding in well-defined ways, for example, generating a natural language answer using knowledge from a pre-defined knowledge base (U.S. Pat. No. 5,884,302). It would be beneficial to enhance this capability by adding some form of deductive reasoning engine or logic prover to provide answers constructed from applying logic to the knowledge base rather than directly from the knowledge base.

However, one cannot simply combine a deductive reasoning engine or logic prover with a natural language processing system; systems that attempt this will produce poor real-world results since they cannot perform such reasoning on millions of deductions and their conclusions, since this is computationally intractable. This means that they either have too few rules to produce useful results, or their reasoning capabilities are severely limited, which again limits the situations in which such systems can produce useful results (U.S. Pat. No. 6,728,692). In addition, the limited representational capability of such systems (such as word tuples, first-order logic, statistical measures, and predicate logic) means that the systems will never be able to capture the full complexity of natural language, since none of these representations can adequately represent the full meaning of words and phrases in natural languages such as English (U.S. Pat. No. 6,263,335 and U.S. Pat. No. 6,675,159). Such systems may have good research or laboratory results yet still fail to perform in the real world due to this lack. Indeed, accurately processing requires the ability to interpret sentences at run-time rather than pre-loading them into predefined knowledge base representations, since the method of reasoning necessary to make sense of real world languages is contextually dependent. Human languages are simply too complex to be represented by strict formalisms.

What is needed is a way to use only the pieces of information that are directly relevant to the current query, without traversing or conducting deductive (or inductive or abductive) reasoning on every piece of information related to each concept in a sentence. The present invention solves these problems by using directed reasoning to selectively conduct only those deductions and logic necessary to understand a sentence and draw relevant conclusions, and by integrating this reasoning directly into the act of parsing. This alleviates the need for a logic prover to carry out all possible logical deductions, which dramatically improves both performance and memory usage. It also prevents the logical problems that can occur if contradictory statements are included in a knowledge base.

Most real-world natural language processing systems also have trouble getting useful information into a knowledge base and constructing useful ontologies. To produce useful results, most such systems require predefined knowledge to be entered into a knowledge base in some formalized representation or to have a well-defined ontology for some particular set of domains. This limits the systems to the narrow domains they are preprogrammed with (U.S. Pat. No. 6,728,692). Systems that can automatically construct ontologies or other knowledge base entries are limited by lack of relevant knowledge, information overload, and rigid mathematical formal representations they cannot adequately represent the full complexities of human language (U.S. Pat. No. 6,263,335 and U.S. Pat. No. 6,675,159). The present invention uses human language to represent such knowledge, avoiding this problem and making it easy to add additional source data (since most documents are written in human language). It allows the use of more complex compound queries that require additional actions to evaluate at run-time, such as queries requiring counting or classifying groups of objects (i.e. "Determine the number of sports cars sold in the United States in 2004").

BRIEF SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In accordance with one embodiment of the present invention is a web site for responding to natural language questions using directed reasoning to automatically identify relevant data and respond to the query in natural language.

The present invention automatically selects the most relevant data sources and utilizes the knowledge contained therein to reason about the query, without requiring any previous knowledge of the data sources or a pre-built ontology or predicate logic system. This allows the present invention to operate on large unstructured corpora that are continuously updated, such as the World Wide Web, while utilising the most recent version of each individual source document.

BRIEF DESCRIPTION OF THE SEVERAL VIEWS OF THE DRAWING

The novel features believed characteristic of the invention are set forth in the appended claims. The invention itself, however, as well as other features and advantages thereof, will be best understood by reference to a detailed description of a specific embodiment which follows, when read in conjunction with the accompanying drawings, wherein:

FIG. 2 is a simplified drawing of the initial web page provided to a web browser by the web server in the preferred embodiment; and FIG. 3 is a simplified drawing of a sample web page returned to the web browser in response to a query in the preferred embodiment.

DETAILED DESCRIPTION OF THE INVENTION

Figure 1:
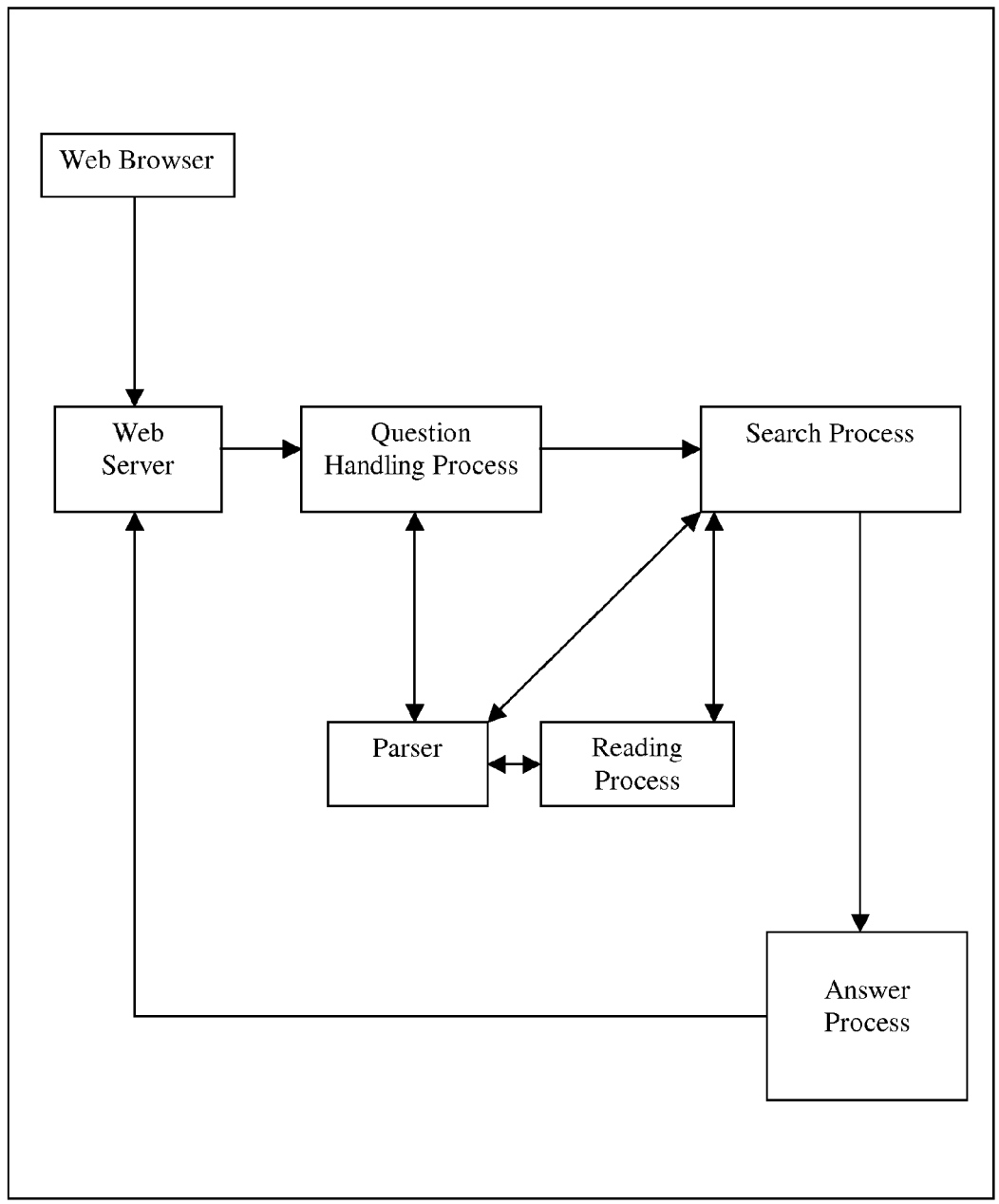
FIG. 1 is a system-level diagram of the software processes used in the preferred embodiment and the interactions between those processes.

The preferred embodiment of the present invention comprises the software processes shown in FIG. 1. A web browser is used to access a web server, which dispatches a request to a question handling process. A question handling process passes the text of the request to a parser, and interprets the response provided by the parser to invoke one or more search processes. A search process will invoke a reading process to interpret each relevant search result, using a parser for additional validation of relevance, and then will invoke an answer process. A reading process will make use of a parser to process text in a document and generate entries in a knowledge base. An answer process will generate results using both the parsed request and any applicable knowledge bases, and display relevant results on a new web page, which it returns to the web server, which in turn passes the results page back to the web browser that dispatched the original request.

To utilize this system, a user connects to a web server using a web browser, and receives a web page containing a text box in which the user may type a query using natural language, as shown in FIG. 2. The web browser transmits this query back to the web server, and the web server invokes a new question handling process and passes the query on to that process. Both the web servers and question handling processes (as well as all of the other processes described below) are load-balanced across multiple computers in a computer network. Alternative embodiments may utilize user interfaces in many forms, including but limited to the following: windowed interaction by using features of a computing environment, an API invoked by a computer program, textual interaction over a terminal, emulated terminal, network protocol, or electronic mail, spoken utterances in the form of audio signals, and visual information that can be interpreted as directional input.

The question handling process invoked calls the parser to parse the query text into syntax trees. Since most sentences have multiple possible syntactic parses, the parser builds a separate syntax tree for each possible syntactic parse of the text and assigns a probabilistic value to each one. In the preferred embodiment, this is done through the use of a HPSG grammar, although alternative embodiments can use other parsers and grammars, as well as semantic parsing. Syntax trees will also be built from partial parses in the case that the parser does not recognize a complete sentence (either because it is not provided, or because the parser's grammar is not sufficient to handle all of the syntax of the text). The knowledge base, described in more detail below, is used to eliminate possible parses that may be valid syntactically but contradict the data in the knowledge base.

The question handling process then walks the most likely syntax tree (the one with the highest probabilistic value) and builds a list of concepts in the sentence. The question handling process then invokes a search process with the text corresponding to each of the concepts in the list. In an alternative embodiment of the present invention, the question handling process invokes the search process with the entire text of the original query, with question words (such as "what") and auxiliary verbs and commonly used words (such as "the") removed. In another alternative embodiment of the present invention, the question handling process additionally invokes the search process with each possible combination of concepts in the list. In another alternative embodiment of the present invention, the question handling process additionally invokes the search process with morphological variants of each concept in the list and related words read from a database. For example, invoking the search process with "dogs" would also invoke the search process with "dog" and "canine".

The search process runs web searches on the text passed to it, using multiple search engines. The preferred embodiment conducts keyword searches on Google and Yahoo Search, but alternative embodiments can use other search engines and other types of searches, including, but not limited to auto-clustering searches, searches on other question answering systems, bigram and trigram searches, and searches on proprietary knowledge bases, local databases and document stores, and Internet blogs. The preferred embodiment compiles a list of the top 50 results from each search engine, filters those results, then invokes the reading process on each item in the list. In the preferred embodiment, the reading process is invoked with the URL and text of each result in the list. The text of each result is retrieved from a local cache, if available, or from the Internet if that address is not cached. In the preferred embodiment, recently used web pages are cached unless marked otherwise by the appropriate HTML tags. The expiration date and time of each cached page is also stored, and expired pages are purged from the cache. In an alternative embodiment, only a reference to the appropriate document is passed to the reading process, and the reading process takes care of loading the appropriate text. This allows the reading process to make use of discourse level data, as well as incorporate image, multimedia, title, header, and other data when reading a document. In addition, when searching through non-Internet collections of data, alternative references including file pointers, indices, and database references are used in the place of URLs. When parsing document types other than HTML documents or text documents, an external parser can be used to provide support for additional document types, such as Microsoft Word documents and PDFs.

The search process filters its results based on multiple criteria. In the preferred embodiment, search results are discarded without being passed to the reading process if the words searched for occur in a phrase inconsistent with the concept or concepts identified by the question handling process. Inconsistencies are determined both by the parser using its grammar for validation, and by looking for contradictions in the knowledge base between entries involving each concept identified in the result document corresponding to the search words and entries involving a concept identified by the question handling process. This allows the search process to discard text such as, "Jon stood on the bank of the river," when the query text is, "What bank did Jon earn interest from?" and a knowledge base contains a rule stating that a bank of a river does not pay interest. Search results resulting from multiple keywords are also discarded if the keywords occur more than a whole sentence apart in the result text. In an alternative embodiment, the rankings provided by a search engine are used to establish a minimum tolerance level for results, and all results below that tolerance level are discarded. In addition, the rankings of different search engines and databases are weighted, using a statistical model developed from previous searches. Weighted results that fall below a specific tolerance level are also discarded. In one alternative embodiment, the statistical model is a neural network that is rewarded or penalized by the number of knowledge base entries relevant to a posed query resulting from a given search result. In another alternative embodiment, the statistical model is a support vector machine that is rewarded or penalized by the user's appraisal of the answers and citations returned by the system in response to the user's query. In this case, search results that contributed to a given answer or citation that a user clicks on are rewarded, while search results that did not contribute to such answers or citations are penalized. After all of the reading processes from all of the search results are completed, the search process invokes an answer process to generate a response.

The reading process takes the document provided and sequentially reads each sentence of textual data. In an alternative embodiment, the order in which sentences are read is determined by other data in a document. The paragraphs of text under the headings in the largest size are read first, then the paragraphs of text under the next largest headings, and so on. Advertisements on a web page are detected by their shape and placement (in the case of a banner ad) or their text (in the case of a box containing the phrase "advertisements" or "sponsored" at the top of the box) and are ignored. Another alternative embodiment only reads sentences that match the search query provided to the search process, and the immediately preceding and succeeding sentences, read in the order of ranking of the matches, as provided by a search engine.

For each sentence that the reading process reads, the sentence is parsed by the parser in much the same way as described in the section on the question handling process above. However, the parser can also make use of the query to identify irrelevant parses of a sentence and discard them. For example, if the query text contains the question, "Where did the red bus stop?" and a sentence reads, "The city is building a new red bus stop at 5th and Market," the parser will automatically ignore the parse which considers "red" to apply to the phrase "bus stop", since that parse would not match the syntactic parse of the query text (where the word "red" only applies to the word "bus"). The preferred embodiment will also further constrain the set of possible parses by using directed reasoning as described later on specific portions of the sentence (in the above example query text, those portions are the noun phrase "the red bus" and the verb "stop", since the system will recognize "Where" and "did" as a question word and an auxiliary verb respectively, using entries in its knowledge base). After identifying the remaining possible parses, the reading process will select the most probable parse and add its entries to a short-term knowledge base. In an alternative embodiment, every possible relevant parse is added to the short-term knowledge base in this manner. Partial sentences and sentence fragments are also added to the short-term knowledge base in the same manner. Each entry added to any knowledge base is tagged with a citation pointing to the document or data store and the position within the document or data store that caused the entry to be made. In the case of duplicate entries, only one entry is stored, but citations to each contributing sentence are recorded.

A syntactic parse tree is used to add entries to a knowledge base by identifying the target text and constructing a fact about it. For example, the text, "a dog has four legs" will add a rule to the knowledge base saying that the concept "a dog" has the property "has four legs", by identifying that the sentence consists of a noun phrase followed by a verb phrase and following a rule in the long-term knowledge base that says that a sentence that consists of a noun phrase followed by a verb phrase should result in a new rule being created that says that the noun phrase has the property consisting of a verb phrase. Other rules can also be added to support more complex forms of syntactic structure. In the preferred embodiment, new entries are stored as natural language text, which allows the representation of higher-order expressions and logic rules than traditional predicate logic or first-order or second-order logic systems. Other entries in a knowledge base can also be stored as functions in binary code or source code that are executed when a rule is evaluated or applied. In an alternative embodiment, a selected form of logic is applied during reasoning involving a rule. The natural language representation of knowledge base entries allows various logical formalisms to be selected when rules are applied rather than when they are stored, and allows a different logical formalism to be used during separate applications of the same rule, to allow for a richer set of context-sensitive logical capabilities. In the preferred embodiment, when applying rules, a logical evaluation function is called to operate on rules stored as the text, "If X then Y." that will evaluate the expression Y as true whenever the expression X is true and record that fact in the same natural language format in the knowledge base currently being used to store data. In an alternative embodiment, this fact is also stored as a statement in second-order logic. A rule also exists stating that the expression "A and B" will be true if and only if both the expression A is true and the expression B is true. A rule also exists stating that the expression "C or D" will be true if either one or both of the expression C and the expression D are true. A rule also exists stating that the expression "not E" will be true if and only if the expression E is false. These evaluations can also be chained with both themselves and other rule applications as described below, using directed reasoning. In an alternative embodiment, new entries are additionally stored as first-order logic statements, using standard first-order predicate techniques well known in the art, allowing traditional first-order predicate logical processing to occur as well if desired.

When a new entry is made in a knowledge base, the reading process will also engage in logic related to that entry. In the preferred embodiment of the present invention, this takes the form of deductive reasoning applied to the new entry. In an alternative embodiment, inductive reasoning and abductive reasoning are also used, with a probabilistic score assigned to the induced or abduced rule based on 10 times the number of contradictions to the rule subtracted from the number of matches, normalized to a score between 0 and 1. This allows specific rules to be generalized if they occur frequently. In the preferred embodiment, deductive reasoning is applied to any rule related to the new entry. For example, the rule saying that the concept "a dog" has the property "has four legs", will be applied to a previously entered rule that states that the concept "Rover" has the property "is a dog" to synthesize a new rule stating that the concept "Rover" has the property "has four legs". In one alternative embodiment, each new rule is then subject to further reasoning processes until no new conclusions can be made. However, in the preferred embodiment, these reasoning processes are directed using the query parsed by the question handling process, to prevent unnecessary reasoning. This means that only reasoning directly related to the parsed query or related to it by a continuous chain of logic will be allowed on rules deducted from other rules. In the preferred embodiment, the directed reasoning process determines that two rules or a sentence or sentence fragment and a rule are related if the portion of a first rule or sentence being used to direct reasoning also occurs in the second rule. However, other definitions of relevance can also be supported by the system by modifying the criteria for relevance. When other parts of the system, such as the parser, use the knowledge base, they can also direct reasoning in a similar manner through the same method. In an alternative embodiment, additional reasoning can also be continued in the background while the rest of the system continues normal operation. The preferred embodiment conducts such reasoning by using both the short-term and long-term knowledge bases, and by storing new rules in the short-term knowledge base. Rules in the short-term knowledge base are later merged into the long-term knowledge base if they are not invalidated or deemed irrelevant by the end of the task performed by the reading process. In an alternative embodiment of the present invention, this merging does not occur until all of the results from a given source have been read by the reading processes. In another alternative embodiment, this merging does not occur until all the results from all sources have been read and the original query has been answered. In another alternative embodiment of the present invention, the short-term and long-term knowledge bases are not separate data stores, and all knowledge is stored in a central knowledge base. In another alternative embodiment of the present invention, separate short-term knowledge bases are maintained for each source, then they are all merged into the long-term knowledge base after all of the short-term knowledge bases are constructed. This allows support for simultaneously dealing with rules that might otherwise contradict each other but make perfect sense when restricted to a specific context or document, and then allow less context-specific rules to be derived from them before merging or while merging knowledge bases together. The preferred embodiment also allows the use of supplemental knowledge bases previously built or supplied by the user, to supplement a query or a search with relevant knowledge, including but not limited to domain-specific knowledge, commonsense knowledge, historical knowledge, and rules specifically relating to the query. These knowledge bases can either be kept separate but used in the reasoning process, or merged into the long-term knowledge base, at the option of the user or the system administrator. The preferred embodiment can support contradictory rules in the same knowledge base, since each rule has its own set of citations. However, in an alternative embodiment, rules that contradict rules in the long-term knowledge base are discarded during the process of merging together knowledge bases.

The reading process also handles morphological variants in the text it operates on. The preferred embodiment creates a version of each syntax tree containing only the infinitive form of each verb, and performs all of the above activities on this syntax tree as well. In one alternative embodiment, this syntax tree will also only contain the present tense of verbs. In this alternative embodiment, only this syntax tree is actually processed, but rules in a knowledge base are tagged with metadata indicating their original tenses (but not their original conjugations, which are generated on-the-fly by the answer process when generating answer sentences). In another alternative embodiment, separate syntax trees are generated for each verb and for each form of morphology (conjugation, tense, comparative, passive voice, etc.). In another alternative embodiment, the same process is also applied to nouns, as well as verb phrases and subordinate clauses as a whole. In the preferred embodiment, the reading process maps morphological forms to one another by first referring to a lookup table, and then by using heuristics encoded in the long-term knowledge base, if the words cannot be found in the lookup table.

The reading process also attempts to resolve pronouns and other contextual referents when possible. In the preferred embodiment, this is achieved by keeping track of the last 10 references (or, in an alternative embodiment, all of the references in the most recent two paragraphs) to each concept that can fit into one of the following categories: noun phrase, action, masculine noun phrase, feminine noun phrase, neuter noun phrase (for languages that support it), verb phrase, and sentence fragment. These categorizations are determined by the parser, rules in the knowledge base, directed reasoning conducted using the knowledge base, and a separate database of word categorization listings. In some cases a word or phrase may appear in multiple categories, both because multiple categories apply, and because there may not be enough information from these sources to completely categorize a word or phrase. When a pronoun or other contextual referent is encountered, the reading process will instead substitute (for that part of the syntax tree) a reference to the most recent occurrence in that category that does not create a contradiction or violate constraints in the knowledge bases. Additional directed reasoning about both the referent and possible substitutions will also occur at this time, to help constrain the number of possible substitutions. For example, the sentences, "Peter went to the park. He was smiling and was happy about that." would cause the system to substitute a reference to the masculine noun phrase "Peter" for the pronoun "He" and a reference to the sentence fragment "Peter was smiling" for the contextual referent "that", by chaining the substitutions.

In the preferred embodiment, new rules that are entered into the knowledge base that can be used to answer the original query will be used to generate an answer sentence when they are entered into the knowledge base (a reading process indicates to the calling search process every time an entry is made into the knowledge base, and the search process calls the answer process). In an alternative embodiment, all possible answer sentences are generated from the entire knowledge base after all the reading processes from all of the search results have completed. The answers are generated by the answer process by first identifying the relevant fragments of the query syntax tree, using rules in either a knowledge base or a separate database. A rule states that questions of the form, "What is X?" should return answers of the form, "X is Y." for any property of the concept "X" of the form, "is Y", where "Y" is an arbitrary syntactic grammatical structure. In an alternative embodiment, the concept "X" and the verb "is" are also identified as relevant to the parse by these rules, although the verb "is" is only identified as relevant in situations where it involves the concept "X". This usage in the alternative embodiment is described later below. Additional question answering rules can be added to support more complex forms of queries and to provide more accurate and more relevant answers. In an alternative embodiment, these rules can also be used to respond to non-question statements, such as, "Name the number of dog breeds with black fur." In the case of multiple morphological variants of otherwise equivalent answers, only a single answer is returned for each set of answers differing only by morphology. In the preferred embodiment, the answer selected from the set is the one morphologically equivalent to the morphological form of the query text. In an alternative embodiment, the first answer found is selected.

In the preferred embodiment, the answer sentences are returned on a web page, sequentially ranked by number of total source citations, with a line of surrounding text from the first citation for each answer sentence and the citation source and number of citations listed. Clicking on the number of citations will provide a full list of citation sources along with the relevant sentences in the cited sources. Each citation source in both cases is listed as a hyperlink linking to the relevant source document. In the event that no answer sentences can be generated in response to a query, the answer process will instead return the top ranking results of the keyword searches provided by the search process. This will also occur if the number of answers falls below a certain number, where the highest-ranking of the answers falls below a set tolerance level, determined by the user or configured by the system administrator. In an alternative embodiment, rankings are weighted by a trust value assigned to each entry in the knowledge base, as well as to each source document. These trust values can be assigned by rules in the knowledge base, individual users, general user usage data, the parser (by recognizing statements such as, "It is not the case that <sentence>", which would assign a trust value to the negation of <sentence>), external validation sources, and common machine learning techniques such as neural networks in response to usage of the sources, usage of the rules entered into a knowledge base, or usage of their resulting answers. Multiple trust values can also be combined to take into account the accuracy ratings from multiple sources. Rules in a knowledge base can also be marked always true or irrefutable with metadata tags by the user or a system administrator. In the preferred embodiment, a rule marked always true always has a trust value of 1 (the highest possible trust value, indicating complete trust), regardless of other factors. A rule marked irrefutable prevents any rule that contradicts it from being entered into the knowledge base.

In other alternative embodiments of the present invention, rules entered in the knowledge base are used to generate metrics and responses other than answer sentences. In one such alternative embodiment, the answer process includes a rule for handling the question, "What are people saying about X?" The user can specify which document sources for the search processes to use. In this case, any rules entered into the knowledge base that refer to the concept "X" are compiled and returned as responses by the answer process in place of answer sentences. In another alternative embodiment, the reading process performs these functions instead of the answer process, so that responses can be continuously incrementally determined as the search and reading processes continue. Further rules can be added to provide additional refinement and pruning of responses. In addition, aggregate statistics about such responses are returned, including the number of distinct documents that each response is derived from, for each verb phrase in the responses, the total number of responses that contain concept "X" followed by that specific verb phrase or its morphological variants, and any other relevant statistics that the system is configured to produce. As mentioned previously, such rules are not limited to questions, and can be augmented by calling external programs. In this alternative embodiment, the command, "Determine the number of companies that make hybrid cars" will return a numerical result, along with a list of source sentences and citations by following a rule that says, "Determine X" should return results that match a concept "X" (in this alternative embodiment, matching refers to results that specifically consist of nothing but concept "X" or its morphological variants, not just results that refer to concept "X" somewhere in the result, although in another alternative embodiment it is enough to simply contain concept "X" somewhere in the result, and in yet another alternative embodiment, it is enough to contain concept "X" somewhere in the result if and only if concept "X" has also been determined to be the subject of that result). This rule in turn will make use of a rule that says, "the number of Y" should return a numerical value consisting of the total number of matches for concept "Y", along with a list of source sentences and citations for those matches. This rule in turn will make use of a rule, "NP that VP" that matches all entries relating to concepts Z in the knowledge base that say that a concept Z has a property VP and concept Z is an instance of NP, where NP is a noun phrase, as well as any morphological variants of NP and VP that fit these criteria. This ability to chain rules and use deductive and other forms of logical reasoning allows many complex commands and queries to be handled by the system. For example (if the system is configured to allow directed reasoning to occur at this point in the process), in addition to returning results that match concept "X", the system also returns any results that match concepts for which there are rules saying that those concepts are instances of "X".

In another alternative embodiment, the command, "Buy 12 shares of the NASDAQ 100 Index when most people are saying that the price of oil will be less than $50" can be used to automatically purchase stock. In this case, there is a rule stating that, "Buy X shares of Y when Z" should cause an order to be executed by the current user's stockbroker for X shares of the stock, index, option, fund, or derivative Y when the condition Z is reached, by calling an external program to execute the order for X shares of Y with the user's credentials. In this alternative embodiment, background processes may be continuously run or run at set, defined intervals to evaluate whether condition Z has been reached yet. As previously described above, Z is determined by a combination of rules. This embodiment has a rule defining "most" as two-thirds of matching results when "most" is applied to people. It also makes use of a rule that says the statement, "people are saying that A" should match all search results that match any morphological variant of A, keeping one result per source document. This embodiment also makes use of another rule that increases the number of search results by stating that the phrase "less than B" will match anything that matches a number (or in this case an expression with a $) less than B in addition to matching the literal phrase (which in this case is, "less than $50").

In the preferred embodiment, after generating the answer sentences and other appropriate responses and citations, the answer process sends the generated web page back to the web server, which in turn returns it to the user's web browser, to display the results to the user, as shown in FIG. 3. In an alternative embodiment, in the case that the answer process determines too many answers are being returned, the user may be asked clarifying questions to help narrow the search. For example, in one alternative embodiment, the question, "What happened on Jun. 24, 2004?" will return too many unique answers (as specified by the system administrator), so the answer process will query the user (in the web server's response) to refine his query to a specific geographic region or topic. In this case, the subsequent query will use the existing knowledge base without conducting additional searches, although this behavior can be overridden by the system administrator. This alternative embodiment can also handle specific ambiguities in a similar manner. For example, when the answer process determines that the word "banks" in the query, "How many banks are in New York?" could refer to either financial institutions or river banks, based on the rules in the knowledge base, it will ask the user, "Do you mean financial banking services or river banks?" by appending the text of each sense of the word, "banks" in its knowledge base to the phrase, "Do you mean", and separating the senses by the conjunction "or". In this alternative embodiment, WordNet is used to add definitions of each sense to the knowledge base, in addition to the rules entered by the reading processes. In another alternative embodiment, the knowledge base is preserved across all queries by a given user, unless the user indicates otherwise, so that the user can build on previous queries, regardless of whether the system asks follow-up questions. In this embodiment, pronouns and other contextual referents are resolved in queries using the same techniques described above by the reading process.

The answer process also inserts contextually relevant advertisements into the page with the answers or other responses provided. In the preferred embodiment, these advertisements are obtained from an external source that the answer process provides with the text of the responses, to allow the external source to supply contextually relevant advertisements. However, twice as many advertisements are obtained as can fit in the appropriate sections of the returned page. These advertisements are then filtered based on the entries in the knowledge base, and only actually inserted into the page if they either share concepts with the text of any of the responses, or directed reasoning allows those concepts to be related using the entries in the knowledge base and the directed reasoning process. If not enough advertisements remain after the filtering process, additional advertisements are obtained from the external source and the process is repeated until enough advertisements can be inserted into the page to fill the appropriate sections of the page. If too many results remain after the filtering process, the results are inserted into the page sequentially, stopping after the appropriate sections of the page are full.

The foregoing description of the preferred embodiment and select alternative embodiments of the invention has been presented for the purposes of illustration and description. It is not intended to be exhaustive or to limit the invention to the precise forms disclosed. Many modifications and variations are possible in light of the above teaching.

We claim:

1. A computer implemented method for responding to a natural language sentence in which:

the terms:

"reasoning" is: using a first concept in a natural language sentence to identify a second concept by creating a continuous chain of logic from the first concept to the second concept; and "directed reasoning" is: applying reasoning to a first concept in a natural language sentence to identify a second concept, wherein only reasoning related to the natural language sentence is allowed, the method comprising the steps of:

receiving, in a computer, at least one input concept, wherein the at least one input concept is generated from parsing an initial natural language sentence;

searching a knowledge base comprising a plurality of natural language sentences using the at least one input concept to retrieve at least one response concept from the knowledge base, the searching step further comprising the step of resolving one or more contextual referents occurring in a natural language sentence of the plurality, wherein each of the one or more contextual referents is a word within the natural language sentence, the word referring to a previously parsed word or a phrase in the natural language sentence or another natural language sentence of the plurality;

performing directed reasoning on both the at least one input concept and the at least one response concept to select at least one selected response concept by connecting the at least one response concept to the at least one input concept through a continuous chain of logic based on at least one of inductive reasoning, deductive reasoning or abductive reasoning;

and generating at least one response sentence containing the at least one selected response concept.

2. The method of claim 1, further comprising the step of outputting at least one response sentence containing the selected response concept, wherein the initial natural language sentence is a question and the at least one response sentence is an answer to the question.

3. The method of claim 1, wherein the knowledge base comprises at least one document derived from the World Wide Web.

4. The method of claim 1, further comprising the step of parsing the initial natural language sentence into at least one syntax tree.

5. The method of claim 1, further comprising the step of parsing the initial natural language sentence into at least one syntax tree, wherein the parsing step includes using directed reasoning to eliminate illogical or nonsensical parses.

6. The method of claim 1, wherein the knowledge base comprises pre-existing natural language sentences found in an information source.

7. The method of claim 6, further comprising the steps of:

constructing new natural language sentences from the pre-existing natural language sentences, wherein the new natural language sentences are not found in the information source; and adding the new natural language sentences to the knowledge base.

8. The method of claim 1, further comprising the step of using directed reasoning to select relevant contextual advertising.

9. The method of claim 1, wherein the resolving step further comprises the step of categorizing the contextual referent into a category.

10. The method of claim 9, wherein the category is selected from the group consisting of: noun phrase, action, masculine noun phrase, feminine noun phrase, neuter noun phrase, verb phrase, and sentence fragment.

11. The method of claim 9, by substituting a reference for the most recent occurrence in the category that does not create a contradiction or violate constraints in the knowledge base.

12. A computer implemented data processing system for responding to a natural language sentence, comprising:

a server computer having computer readable program code means, the computer readable program code means further comprising:

means for obtaining at least one input concept, wherein the at least one input concept is generated from parsing an initial natural language sentence;

means for searching a knowledge base using the at least one input concept to retrieve at least one response concept from the knowledge base, and resolving a contextual referent occurring in a natural language sentence of the knowledge base by categorizing the contextual referent into a category and substituting a reference for the most recent occurrence in the category that does not create a contradiction or violate constraints in the knowledge base;

means for performing directed reasoning on the at least one input concept and the at least one response concept and selecting at least one of the response concept by connecting the response concept to the input concept through a continuous chain of logic based on at least one of inductive reasoning, deductive reasoning or abductive reasoning;

and means for generating at least one response sentence containing the at least one selected concept.

13. The system of claim 12, wherein the initial natural language sentence is a command that executes the effects described by the natural language sentence.

14. The system of claim 12, wherein the knowledge base comprises pre-existing natural language sentences found in an information source.

15. The system of claim 14, further comprising:
means for constructing new natural language sentences from the pre-existing natural language sentences, wherein the new natural language sentences are not found in the information source; and
means for adding the new natural language sentences to the knowledge base.

16. The method of claim 12, wherein the category is selected from the group consisting of: noun phrase, action, masculine noun phrase, feminine noun phrase, neuter noun phrase, verb phrase, and sentence fragment.

17. A computer-implemented method of responding to a natural language sentence, comprising:
parsing an initial natural language sentence to obtain at least one search term;
searching, on a computer, an information source using the at least one search term and retrieving at least one pre-existing natural language text relating to the search term;
reading the at least one pre-existing natural language text and storing the at least one pre-existing natural language text in a knowledge base, the reading step including the step of applying directed reasoning to resolve one or more contextual referents within the at least one pre-existing natural language text, wherein each of the one or more contextual referents is a word that refers to a previously parsed word or a previously parsed phrase in the at least one pre-existing natural language text;
constructing at least one new natural language text from the at least one preexisting natural language text;
generating at least one response derived from the at least one new natural language text.

18. The method of claim 17, further comprising the step of outputting the at least one response, wherein the initial natural language sentence is a question and the at least one response is an answer to the question.

19. The method of claim 17, wherein the information source is the World Wide Web.

20. The method of claim 17, wherein the parsing step further comprising the step of using the initial natural language sentence to prevent or eliminate a search term that is inconsistent with or irrelevant to the initial natural language sentence.

21. The method of claim 17, wherein the searching step further comprising the step of using the initial natural language sentence to prevent or eliminate the retrieval of textual data that is inconsistent with or irrelevant to the initial natural language sentence.

22. The method of claim 17, wherein the constructing step further comprising the step of using the initial natural language sentence to prevent or eliminate the construction of a new natural language text that is inconsistent with or irrelevant to the initial natural language sentence.

23. The method of claim 22, wherein the new natural language text is constructed from the pre-existing natural language texts by applying a logical reasoning process using at least one of inductive reasoning, deductive reasoning or abductive reasoning.

24. The method of claim 17, wherein the parsing step further comprises the step of resolving a contextual referent occurring in the initial natural language sentence by categorizing the contextual referent into a category and substituting a reference for the most recent occurrence in the category that does not create a contradiction or violate constraints in a knowledge base, the category selected from the group consisting of: noun phrase, action, masculine noun phrase, feminine noun phrase, neuter noun phrase, verb phrase, and sentence fragment.

* * * * *